(12) United States Patent
Schmidt

(10) Patent No.: US 11,498,664 B2
(45) Date of Patent: Nov. 15, 2022

(54) BRAKE ASSEMBLY WITH DRIVE CAPABILITIES FOR LANDING GEAR

(71) Applicant: Safran Landing Systems Canada Inc., Ajax (CA)

(72) Inventor: Robert Kyle Schmidt, Brooklin (CA)

(73) Assignee: SAFRAN LANDING SYSTEMS CANADA INC., Ajax (CA)

( * ) Notice: Subject to any disclaimer, the term of this patent is extended or adjusted under 35 U.S.C. 154(b) by 87 days.

(21) Appl. No.: 16/926,367

(22) Filed: Jul. 10, 2020

(65) Prior Publication Data
US 2022/0009622 A1 Jan. 13, 2022

(51) Int. Cl.
*B64C 25/44* (2006.01)
*B64C 25/34* (2006.01)

(52) U.S. Cl.
CPC ............ *B64C 25/44* (2013.01); *B64C 25/34* (2013.01)

(58) Field of Classification Search
CPC .......... B64C 25/44; B64C 25/34; B64C 25/42
See application file for complete search history.

(56) References Cited

U.S. PATENT DOCUMENTS

| | | | | |
|---|---|---|---|---|
| 3,623,576 A * | 11/1971 | Waring | ........... | F16D 55/40 188/71.6 |
| 3,977,631 A * | 8/1976 | Jenny | ........... | F16D 55/40 244/50 |
| 3,995,721 A * | 12/1976 | Chambers | ........... | F16D 55/40 188/196 A |
| 4,147,241 A * | 4/1979 | Preniczny | ........... | B64C 25/44 428/920 |
| 9,540,097 B2 * | 1/2017 | Schmidt | ........... | B64C 25/24 |
| 2011/0156472 A1 * | 6/2011 | Bucheton | ........... | B64C 25/44 301/6.2 |
| 2012/0138735 A1 | 6/2012 | Nierlich | | |

(Continued)

FOREIGN PATENT DOCUMENTS

| | | |
|---|---|---|
| DE | 10 2008 006 295 A1 | 7/2009 |
| EP | 3 121 077 A1 | 1/2017 |
| WO | 2011/030365 A2 | 3/2011 |

OTHER PUBLICATIONS

Schmidt, R.K., "Autonomous Electric Taxiing Wheel with Electrically Actuated Brake," U.S. Appl. No. 16/868,374, filed May 6, 2020.

(Continued)

*Primary Examiner* — Philip J Bonzell
*Assistant Examiner* — Tye William Abell
(74) *Attorney, Agent, or Firm* — Christensen O'Connor Johnson Kindness PLLC

(57) ABSTRACT

A landing gear system includes a wheel rotatably coupled to an axle about an axis. A torque tube is rotatably mounted to the axle about the axis such that the axle extends through a central portion of the torque tube. A rotor is fixed in rotation about the axis relative to the wheel, and a stator is fixed in rotation about the axis relative to the torque tube. The landing gear assembly further includes a clutch assembly selectively reciprocal between an engaged state and a disengaged state. The stator is fixed in rotation about the axis relative to the torque tube when the clutch assembly is in an engaged state. When the clutch assembly is in a disengaged state, the stator is rotatably about the axis relative to the torque tube.

19 Claims, 5 Drawing Sheets

(56) References Cited

U.S. PATENT DOCUMENTS

2012/0318909 A1* 12/2012 Bennett .................. B64C 25/34
244/50
2013/0327884 A1* 12/2013 Yiu ........................ F16D 55/36
244/50

OTHER PUBLICATIONS

International Search Report dated Oct. 20, 2021, issued in corresponding International Application No. 6202050917, filed Jul. 6, 2021, 4 pages.
Written Opinion dated Oct. 20, 2021, issued in corresponding International Application No. PCT/CA2021/050917, filed Jul. 6, 2021, 6 pages.

* cited by examiner

BRAKE ASSEMBLY WITH DRIVE CAPABILITIES FOR LANDING GEAR

BACKGROUND

Autonomous drive devices allow aircraft to be moved without the assistance of a tractor while the jet engines of the aircraft are not currently in operation. These devices are typically proposed to operate by providing drive capabilities to one or more wheels of an aircraft. By utilizing electric or hydraulic motors (or other power sources) to drive the wheels, operators can push back from gates and taxi without having to use their jet engines or tow tractors. As a result, fuel costs, wear and maintenance on the jet engines, and noise are all reduced.

An exemplary embodiment of a known autonomous drive device is disclosed in U.S. Pat. No. 9,540,097, issued to Schmidt et al., ("Schmidt") and currently assigned to Safran Landing Systems, the disclosure of which is expressly incorporated herein. Schmidt describes an aircraft undercarriage, i.e., landing gear, that includes a landing gear strut mounted at one end to an aircraft and coupled to an axle at the other end. A pair of wheels are mounted to the axle. Motor units rotate a series of rods and shafts, including a pair of drive shafts, that extend down through the strut and are connected to each other by an angle transmission and bevel gears. The motor units rotate the drive shafts, which are disposed within the axle and connected to the wheels, to provide the system with drive capabilities.

While known systems that provide autonomous taxiing exist for powering the wheels of an aircraft landing gear to permit movement on the ground, most of these systems involve adding an entirely new set of motors, gearboxes, and transmission systems (as well as control systems and power distribution) to the aircraft, often resulting in an unacceptable weight increase to the aircraft. Further, space on aircraft is often limited, particularly in the landing gear areas, making it difficult to add components to drive an autonomous taxiing system.

SUMMARY

Embodiments of autonomous taxiing systems for aircraft are set forth below according to technologies and methodologies of the present disclosure. Landing gear for an aircraft are configured with a taxiing system that utilizes existing brake systems components to power the taxiing system. More specifically, existing motors that selectively actuate the aircraft brake systems are also configured for applying a brake force to one or more wheels to selectively drive one or more wheels of the aircraft landing gear.

A first representative embodiment of a landing gear system includes a wheel rotatably coupled to an axle about an axis. A torque tube is rotatably mounted to the axle about the axis such that the axle extends through a central portion of the torque tube. A rotor is fixed in rotation about the axis relative to the wheel, and a stator is fixed in rotation about the axis relative to the torque tube. The landing gear assembly further includes a clutch assembly selectively reciprocal between an engaged state and a disengaged state. The stator is fixed in rotation about the axis relative to the torque tube when the clutch assembly is in the engaged state. When the clutch assembly is in the disengaged state, the stator is rotatably about the axis relative to the torque tube.

In any embodiment, the landing gear system further comprises a plurality of linear actuators and a transmission converting linear actuator motion from the plurality of linear actuators into rotational movement of the stator when the clutch assembly is in the disengaged state.

In any embodiment, the transmission transfers linear actuator motion from the plurality of linear actuators to engage the rotor with the stator.

In any embodiment, engagement of the rotor with the stator provides a driving force that rotates the wheel when the clutch assembly is in the disengaged state.

In any embodiment, engagement of the rotor with the stator provides a braking force when the clutch assembly is in the engaged state.

In any embodiment, the transmission comprises a cam operably coupled to the stator and fixed in rotation about the axis relative to the stator, and a plurality of cam followers, each cam follower being coupled to one of the plurality of linear actuators.

In any embodiment, each of the plurality of actuators selectively extends and retracts when the clutch assembly is in the disengaged state to engage and disengage the cam followers from the cam, wherein engagement and disengagement of the cam followers from the cam rotates the cam about the axis.

In any embodiment, extending and retracting each of the plurality of actuators in a first sequence rotates the cam in a first direction.

In any embodiment, extending and retracting each of the plurality of actuators in a second sequence rotates the cam in a second direction.

In any embodiment, the cam comprises a cam surface having a sinusoidal profile.

In any embodiment, the cam comprises a planar cam surface angled relative to the axis.

In any embodiment, the clutch assembly comprises one of a curvic clutch and a dog clutch.

A second representative embodiment of a landing gear system includes a wheel rotatably coupled to an axle about an axis. A rotor is fixed in rotation about the axis relative to the wheel, and a stator is rotatably mounted to the axle about the axis. A clutch assembly is selectively reciprocal between an engaged state and a disengaged state. The stator is fixed in rotation about the axis when the clutch assembly is in an engaged state. When the clutch assembly is in a disengaged state, the stator is rotatable about the axis. The landing gear system further includes a plurality of linear actuators, each linear actuator being configured to be extended and retracted, and a transmission operably coupled to the plurality of plurality of linear actuators. The transmission applies an axial force to engage the stator with the rotor when the clutch assembly is in the engaged state and when the clutch assembly is in the disengaged state.

In any embodiment, the transmission converts axial forces applied by the plurality of linear actuators into a moment that rotates the cam.

In any embodiment, the transmission comprises a cam coupled to the stator and a plurality of cam followers, wherein each cam follower is coupled to one of the plurality of linear actuators.

In any embodiment, each of the plurality of actuators selectively extends and retracts when the clutch assembly is in the disengaged state to engage and disengage the cam followers from the cam, wherein engagement and disengagement of the cam followers from the cam rotates the cam about the axis.

In any embodiment, extending and retracting each of the plurality of actuators in a first sequence rotates the cam in a first direction.

In any embodiment, extending and retracting each of the plurality of actuators in a second sequence rotates the cam in a second direction.

In any embodiment, the cam comprises a cam surface having a sinusoidal profile.

In any embodiment, the cam comprises a planar cam surface angled relative to the axis.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Examples of an autonomous electric taxiing wheel for an aircraft landing gear with electrically actuated brake are set forth below according to technologies and methodologies of the present disclosure. In an embodiment, existing actuators that drive the brakes are also utilized to provide a rotational force to the wheels to move without the use of tow tractors or engine thrust.

Figure 1:
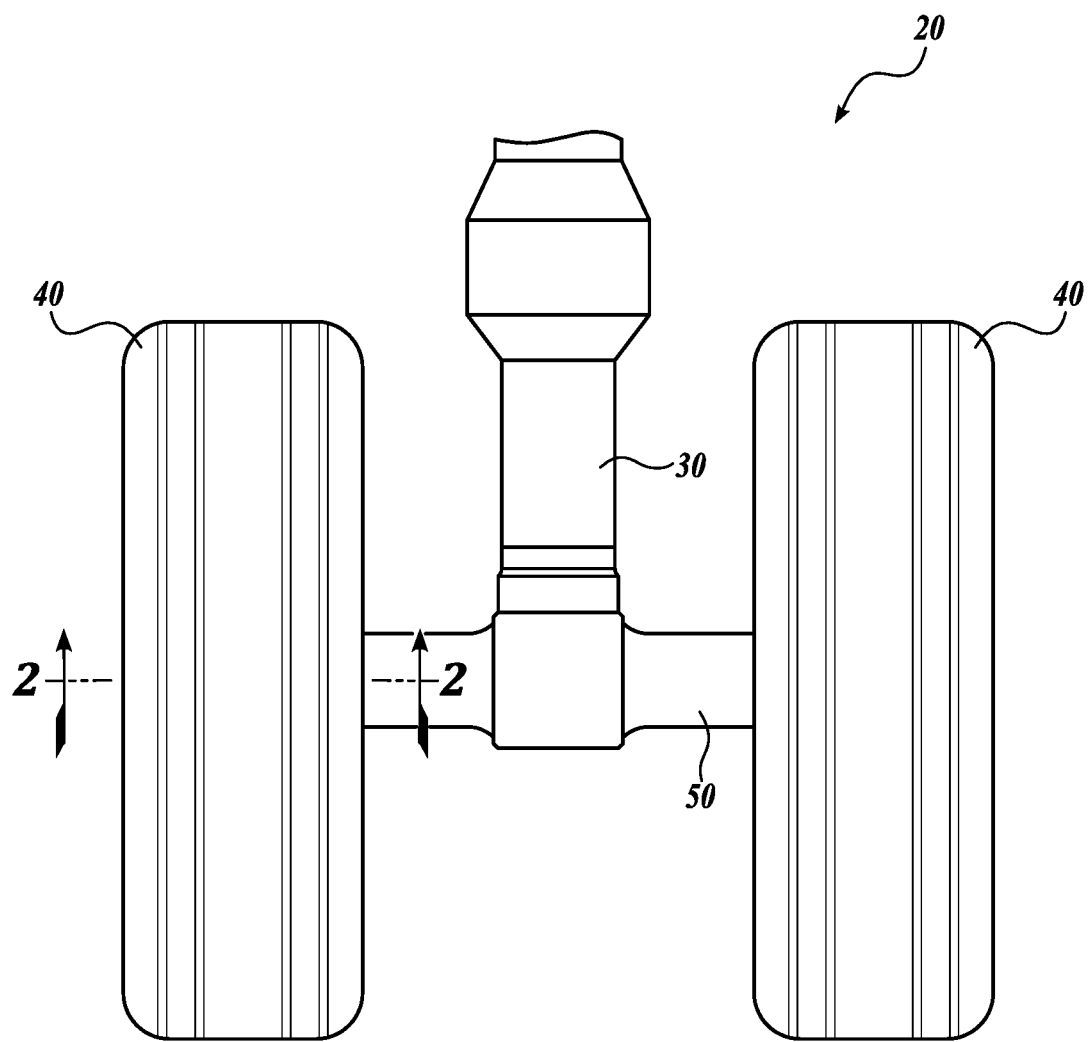
FIG. 1 shows a rear view of a first representative embodiment of a landing gear system with a brake assembly according to the present disclosure.

FIG. 1 shows an exemplary landing gear system 20 suitable for use with a disclosed brake assembly. The landing gear system 20 includes a strut 30 and an axle 50. One end of the strut 30 is coupled to the aircraft (not shown), and the other end of the strut is coupled to the axle 50. In the illustrated embodiment, the axle 50 extends laterally outward from the strut 30 and has a wheel 40 rotatably mounted to each end.

Figure 2:
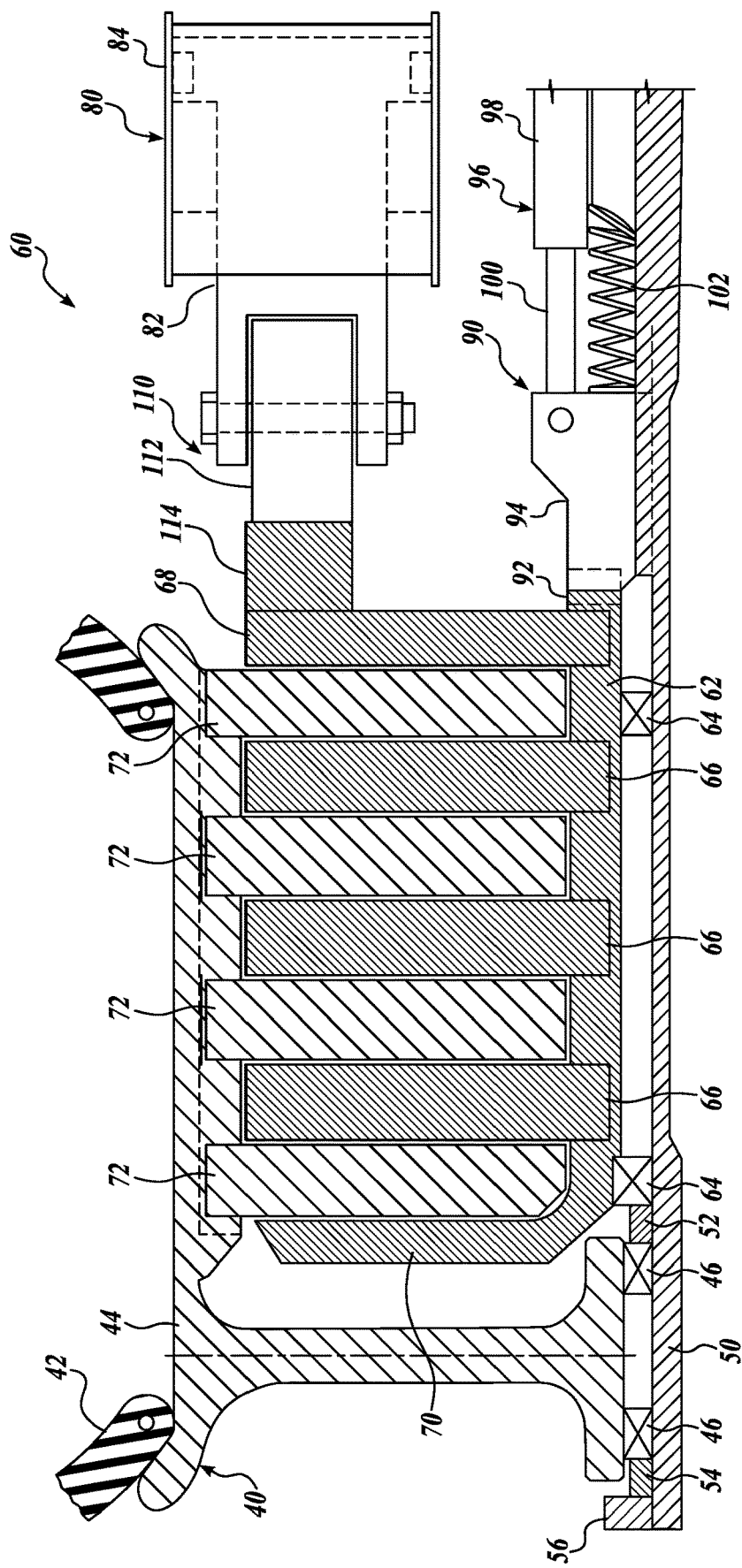
FIG. 2 shows a partial cross-sectional view of the brake assembly of the landing gear system shown in FIG. 1, wherein the brake assembly is in a brake mode.
Figure 3:
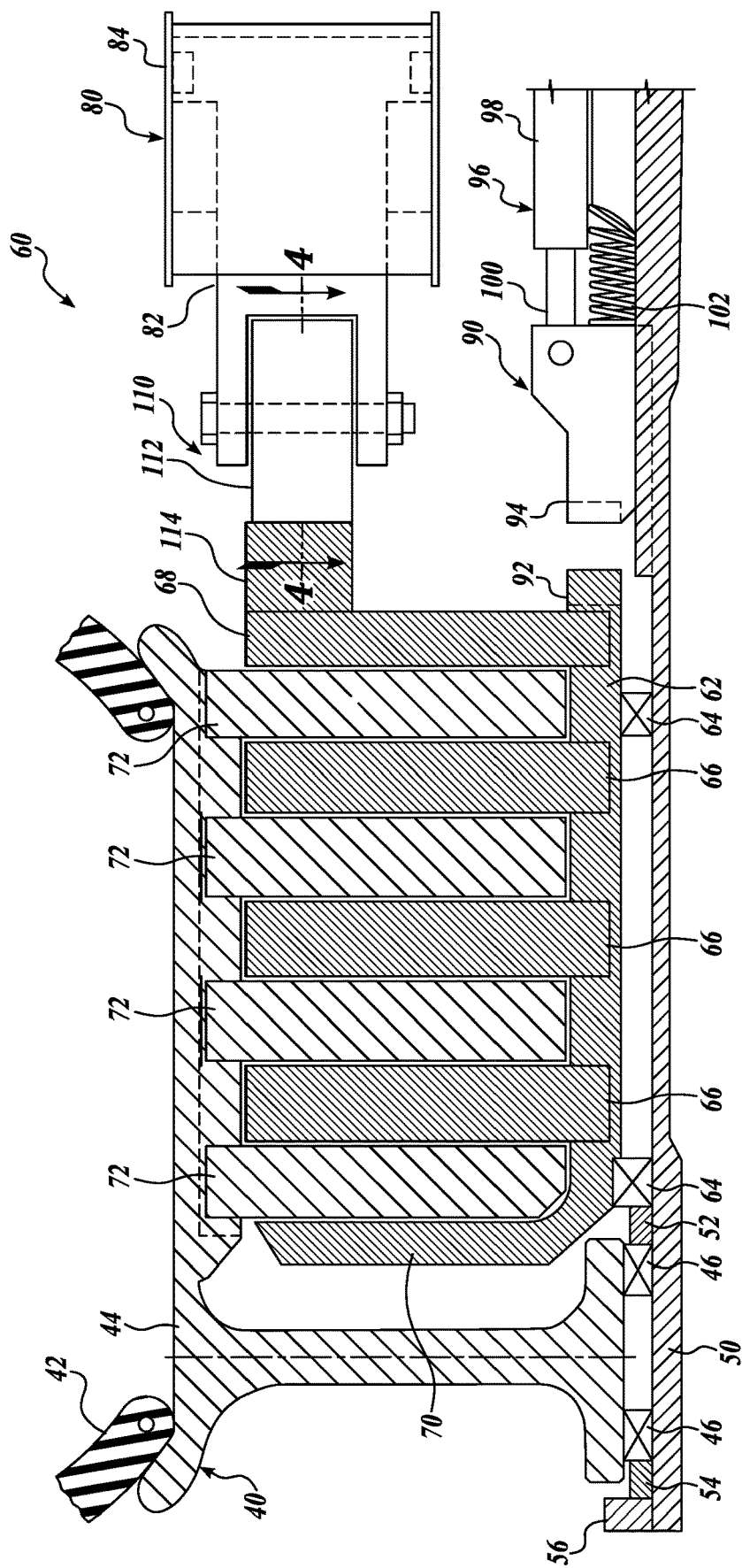
FIG. 3 shows a partial cross-sectional view of the brake assembly of the landing gear system shown in FIG. 1, wherein the brake assembly is in a drive mode.

As shown in FIGS. 2 and 3, each wheel 40 includes a pneumatic tire 42 mounted to a rim 44. The rim 44 is mounted to the axle 50 by a pair of bearings 46. The bearings 46 allow the wheel 40 to rotate about the centerline 300 of the axle 50.

At least one of the wheels 40 of the landing gear assembly 20 is associated with a brake assembly 60. The brake assembly 60 applies a braking force to the wheel 40 to resist rotation of the wheel relative to the axle 50. In this manner, the brake assembly 60 can apply a braking force to slow and/or stop a rotating wheel 40, thereby slowing/stopping the aircraft. In some embodiments, the brake assembly 60 is configured to apply a braking force to a stationary wheel 40 so that the brake assembly also acts as a parking brake that prevents unwanted movement of a parked aircraft.

As will be described in further detail, the illustrated brake assembly 60 is a multi-disc brake assembly that includes a stack of stators 66 and rotors 72. The brake assembly 60 includes an annular torque tube 62 mounted to the axle 50 by bearings 64 so that the axle 50 extends through the torque tube, and the torque tube is rotatable about the centerline 300 of the axle. A pressure plate 68 extends radially outward from one end of the torque tube 62, and an end plate 70 extends radially outward from the opposite end of the torque tube. In the illustrated embodiment, one or more spacers 52 and 54 and a wheel nut 56 react axial loads on the torque tube 62 during a braking or taxiing event.

A plurality of annular stators 66 are mounted to the torque tube 62 between the pressure plate 68 and the end plate 70. The stators 66 extend radially outward from the torque tube 62 and are rotatably fixed to the torque tube relative to axis 300. That is, when the torque tube 62 rotates about axis 300, the stators 66 also rotate about axis 300.

Still referring to FIGS. 2 and 3, a plurality of annular rotors 72 extend radially inward from the rim 44 of the wheel. The rotors 72 are positioned so that the stators 68 and rotors form a stack of alternating rotors and stators extending between the pressure plate 68 and the end plate 70. The rotors 72 are keyed to the rim 44 of the wheel 40 so that rotation of the wheel also rotates the rotors about axis 300.

A clutch assembly 90 is provided to selectively lock rotation of the torque tube 62 about axis 300 relative to the axle 50. In the embodiment shown, the clutch assembly 90 includes a first clutch portion 92 mounted to or integral with the torque tube 62, and a second clutch portion 94 is slidably mounted to the axle 50 for translational movement along the direction of axis 300. The second clutch portion 94 is rotationally fixed relative to the axle 50, i.e., the second clutch portion will not rotate about axis 300 relative to the axle 50. In the illustrated embodiment, the second clutch portion 94 includes one or more longitudinal splines extending radially inward to engage with corresponding slots formed in the axle 50. The engagement of the splines with the slots allows translational movement of the second clutch portion 94 relative to the axle 50 along axis 300 while preventing rotation of the second clutch portion relative to the axle 50 about axis 300. It will be appreciated that the described embodiment is exemplary only, and other configurations are possible to allow for the translational movement of the second clutch portion 94 relative to the axle 50 while preventing rotation of the second clutch portion relative to the axle about axis 300, and such configurations should be considered within the scope of the present disclosure.

An actuator 96 is fixedly positioned relative to the axle 50 to selectively reciprocate the second clutch portion 94 between a first position (FIG. 2) and a second position (FIG. 3). In the first position, the second clutch portion 94 is engaged with the first clutch portion 92. In the second position, the second clutch portion 94 is disengaged from the first clutch portion.

In the illustrated embodiment, the actuator 96 is a linear actuator with a cylinder 98 fixedly positioned relative to the axle 50 by a bracket, a housing, or some other suitable feature (not shown). The actuator 96 also includes a piston 100 having a first end slidably dispose within the cylinder 98. A second end of the piston 100 is coupled to the second clutch portion 94. A spring 102 biases the clutch toward the first position so that in the event of an actuator 96 failure, the clutch assembly 90 will remain in or return to the engaged state of FIG. 2. It will be appreciated that the actuator 96 is not limited to the disclosed embodiment, but can include any suitable type of actuator configured to reciprocate the second clutch portion 94 between the first position of FIG. 2 and the second position of FIG. 3. In some embodiments, the actuator 96 can be, but is not limited to, a hydraulic, pneumatic, or electromagnetic actuator.

When the clutch assembly 90 is engaged, as shown in FIG. 2, rotation of the torque tube 62 relative to axis 300 is prevented, and rotational forces applied to torque tube 62 are reacted through the clutch assembly 90 into the axle 50. When the clutch assembly 90 is disengaged, as shown in FIG. 3, the torque tube 62 and, thus, the stators 66 are rotatable relative to the axle 50 about axis 300.

In some embodiments, the clutch assembly 90 is a curvic clutch or a dog clutch, however, it will be appreciated that any suitable clutch configuration may be utilized to selectively fix rotation of the torque tube 62 relative to the axle, and such configurations should be considered within the scope of the present disclosure.

The landing gear system 20 also includes a plurality of actuators that cooperate to selectively provide an axial force that generates a braking force and a rotational force that drives the wheels. The plurality of actuators 80 are mounted circumferentially about the axle 50 by one or more housings, brackets, or other suitable elements (not shown). Each actuator 80 includes an actuator housing 84 with a piston 82 slidably extending therefrom in a direction parallel to the direction of axis 300. In some embodiments, the actuator 80 includes a ball screw (not shown) disposed within the housing 84 and coupled to the piston 82. The ball screw is selectively rotatable in a first direction to extend the piston 82 and in a second direction to retract the piston. In some embodiments, each actuator 80 is configured to be extended and retracted independent of the other actuators. In some embodiments, two or more actuators 80 are configured to be extended and retracted in unison with each other but independent of the remaining actuators.

A transmission 110 operably engages the actuators 80 and the pressure plate 680. More specifically, the transmission 110 receives linear input from the actuators and converts at least a portion of the linear input to rotational output applied to the pressure plate 68.

The transmission includes a plurality of cam followers 112, wherein each cam follower is coupled to the end of the piston 82 of one of the actuators 80. In the illustrated embodiment, the cam follower 112 is a roller rotatably coupled to the piston 82. The transmission 110 also includes a cam 114 with a cam surface 116 formed thereon. When the actuator 80 extends, the cam follower 112 contacts and applies a force to the cam surface 116 of a cam 114, which is coupled to or integrally formed with the pressure plate 68.

Figure 4:
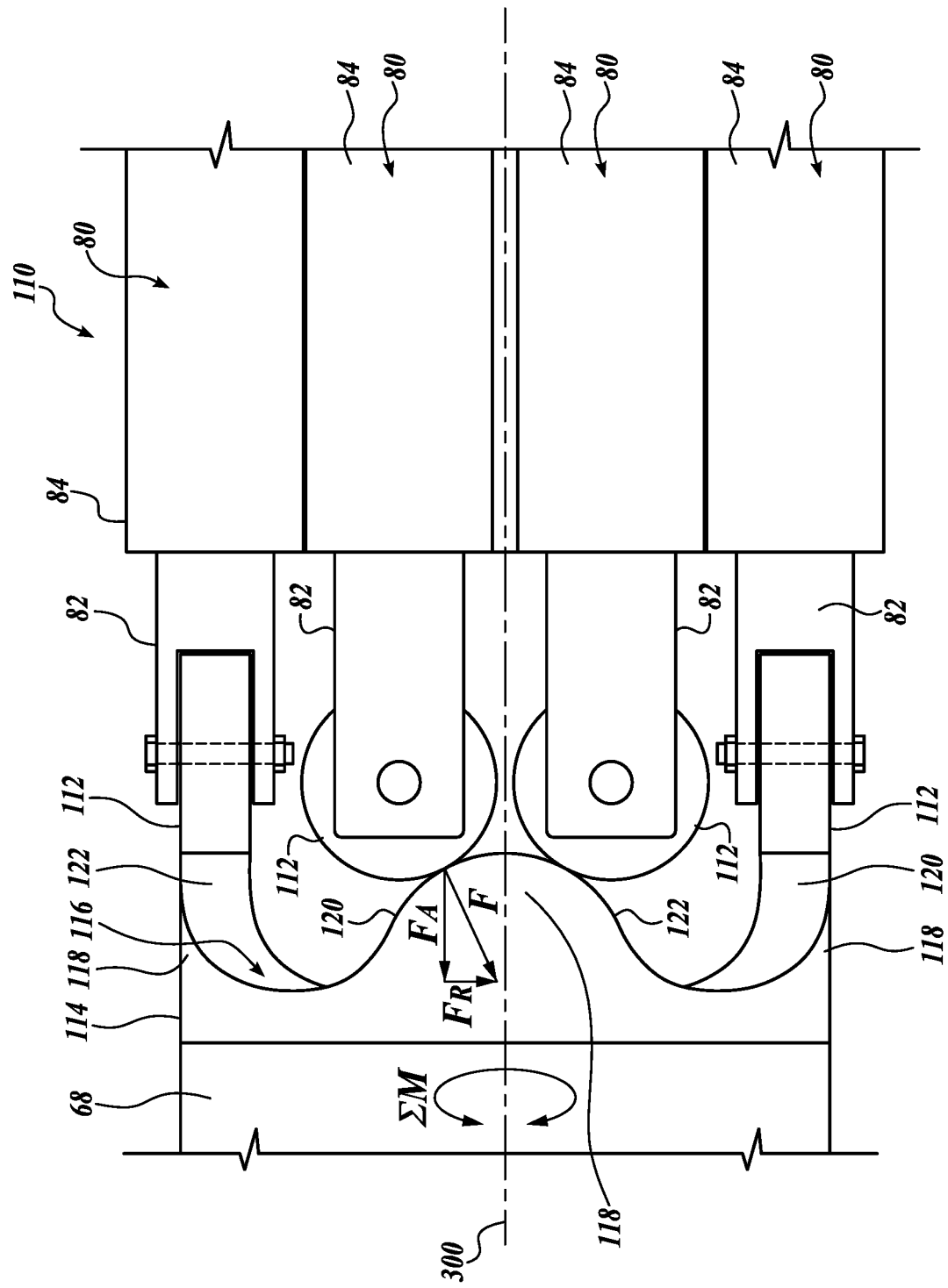
FIG. 4 shows a side view of a first representative embodiment of a transmission of the brake assembly shown in FIG. 3.

Referring now to FIG. 4, an embodiment of a cam 114 is shown. In the illustrated embodiment, the cam 114 has a generally sinusoidal cam surface 116 formed proximate to the cam followers 112. In this regard, the cam surface defines a plurality of lobes 118 having a first side 120 and a second side 122.

The described brake assembly 60 is capable of providing both a braking force to the wheel as well as a driving force to rotate the wheel. Under normal operating conditions, the brake assembly 60 is in the braking position shown in FIG. 2. In the braking position, the clutch assembly 96 is engaged so that the torque tube 62, rotors 66, pressure plate 68, end plate 70, and cam 114 are all fixed in rotation about axis 300 relative to the axle 50. The wheel 40 is rotatable about axis 300 relative to the axle 50, and the rotors 72 rotate relative to axis 300 with the wheel.

One or more of the actuators 80 extend so that each of the cam followers 112 of the extended actuators apply a force F to the cam surface 116, as shown in FIG. 4. The line of action of the force F is normal to the surface of the cam follower 112 and the cam surface 116 at the point of contact and resolves into an axial force $F_A$ (in the direction of axis 300) and a rotational force $F_R$ normal to the axial force $F_A$.

The axial forces $F_A$ combine to urge the pressure plate 68 toward the end plate 70. As a result, adjacent stators 66 and rotors 72 engage each other. Friction between the engaged stators 66 and rotors 72 generate a resistive braking force that is reacted to the wheels 40 through the stators. When the actuators are retracted, the stators 66 and rotors 72 disengage from each other, and the resistive braking force ceases.

The rotational force $F_R$ is offset from axis 300 and is normal to the corresponding axial force $F_A$. As a result, the rotational force $F_R$ results in a moment M that urges the cam 114, as well as the pressure plate 68, torque tube 62, stators 66, and end plate 70, to rotate about axis 300. The magnitude and direction of the rotational force $F_R$ depends upon where the cam follower 112 contacts the cam surface 116 of the corresponding lobe 118. Still referring to FIG. 4, when contact between the cam follower 112 and the cam surface 116 is located on a first side 120 of the lobe 118, the rotational force $F_R$ results in a moment M that urges the cam 114 to rotate in a first direction about axis 300. When contact between the cam follower 112 and the cam surface 116 is located on a second side 122 of the lobe 118, the rotational force $F_R$ results in a moment M that urges the cam 114 to rotate in a second direction (opposite the first direction) about axis 300.

The moments M generated by the rotational forces $F_R$ at the cam followers 112 combine to form a net moment $\Sigma M$ that urges the cam to rotate about axis 300. However, engagement of the clutch assembly 90 prevents this rotation, and the net moment $\Sigma M_R$ is reacted through the clutch into the axle 50. Thus, when the clutch assembly 90 is engaged as shown in FIG. 2, extension of the actuators 80 generates (a) an axial force $F_A$ that compresses the stators 66 and rotors 72 to generate a braking force to resist rotation of the associated wheel 40, and (b) a net moment $\Sigma M_R$ that is reacted into the axle 50 such that the torque tube 62, stators 66, pressure plate 68, end plate 70, and cam 114 are all fixed in rotation about axis 300.

When a drive force is desired, e.g., during taxiing, the brake assembly 60 is in the drive position shown in FIG. 3. In the drive position, the clutch assembly 96 is disengaged so that the torque tube 62, rotors 66, pressure plate 68, end plate 70, and cam 114 are rotatable about axis 300 relative to the axle 50. The wheel 40 is rotatable about axis 300 relative to the axle 50, and the rotors 72 rotate relative to axis 300 with the wheel.

The actuators 80 are selectively extended and retracted so that only cam followers 112 generating a rotational force $F_R$ on the cam 114 in the desired direction are in contact with the cam surface 116. In this regard, if rotation of the cam 114 in a first direction is desired, actuators with cam followers 112 positioned to contact a first side 120 of a cam surface lobe 118 are extended, and the remaining actuators are retracted. As a result, all of the rotational forces $F_R$ tend to rotate the cam 114 in the same direction. The cam 114, which is unrestrained by the clutch assembly 90, rotates under the influence of net moment $\Sigma M_R$ that results from the rotational forces $F_R$.

As the cam 114 and, therefore, the cam surface 116 rotate, the actuators 80 extend and retract so that only cam followers 112 contacting a first side 120 of a lobe 118 are exerting a force on the cam 114. That is, any actuator 80 for which the associated cam follower 112 would contact the second side 122 of a lobe 118 if extended, is retracted. By continuously extending and retracting the actuators 80 to apply forces to the first side 120 of the lobes only, the cam 114 is continuously rotated in the first direction about axis 300.

To rotate the cam 114 in the second (opposite) direction about axis 300, the actuators extend and retract so that only cam followers 112 contacting a second side 122 of a lobe 118 are exerting a force on the cam 114. That is, any actuator 80 for which the associated cam follower 112 would contact the first side 122 of a lobe 118 if extended, is retracted. In this manner, the actuators 80 can be selectively extended and retracted to rotate the cam 114 in either direction about axis 300.

Referring back to FIG. 3, while the rotational forces $F_R$ are rotating the cam 114, the axial forces $F_A$ act on the pressure plate 68 to compress the stators 66 and rotors 72 into engagement with each other. As the cam 114 rotates about axis 300, the torque tube 62 and stators 66 also rotate. Because the stators 66 and rotors 72 are compressed, the frictional engagement of each stator 66 with the adjacent rotors 72 drives the rotors 72 and, therefore, the wheel 40 to rotate with the cam. Thus, the wheel 40 can be selectively driven in a first direction and a second direction by controlling the actuators 80 to rotate the cam 114 in the first and second directions, respectively.

Figure 5:
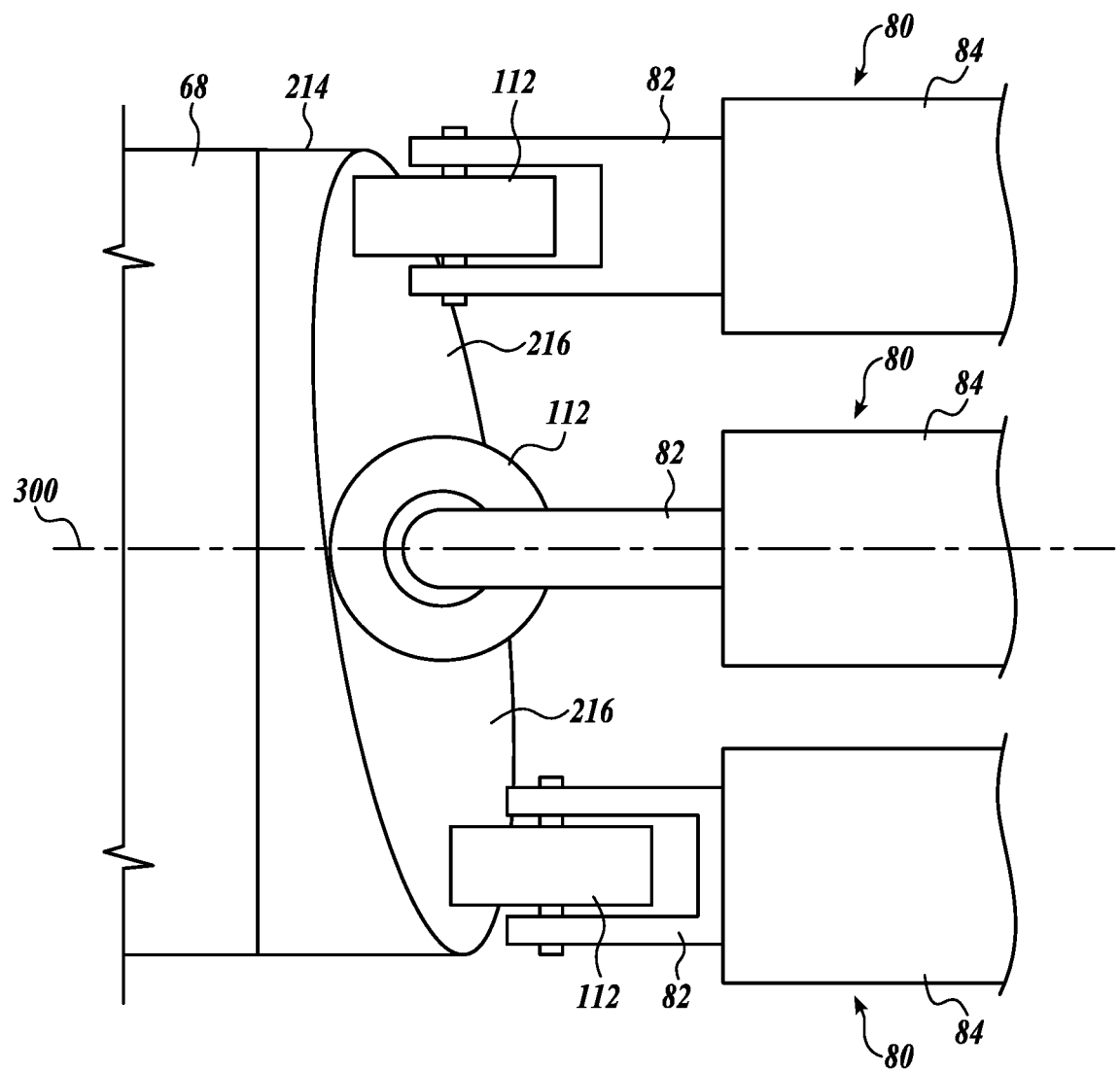
FIG. 5 shows a side view of a second representative embodiment of a transmission of the brake assembly shown in FIG. 3.

Referring now to FIG. 5, a second representative embodiment of a transmission 210 is shown. The transmission 210 is similar to the previously described transmission 110 except that the cam surface 216 of the cam 214 is planar surface has a planar face, similar to swash plates or nutating wobble plates. It will be appreciated that the present disclosure is not limited to the illustrated embodiments of the disclosed cam and cam surfaces. In this regard, cams with any number of suitable cam surfaces by be utilized to engage with the cam followers and actuators to (1) provide an axial clamping force when the clutch assembly 90 is engaged, and (2) provide an axial clamping force and a rotational force when the clutch assembly is disengaged. Such variations should be considered within the scope of the present disclosure.

The present application may reference quantities and numbers. Unless specifically stated, such quantities and numbers are not to be considered restrictive, but exemplary of the possible quantities or numbers associated with the present application. In this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

While illustrative embodiments have been illustrated and described, it will be appreciated that various changes can be made therein without departing from the spirit and scope of the disclosure.

The embodiments of the invention in which an exclusive property or privilege is claimed are defined as follows:

1. A landing gear system, comprising:
   a wheel rotatably coupled to an axle about an axis;
   a torque tube rotatably mounted to the axle about the axis, the axle extending through a central portion of the torque tube;
   a rotor fixed in rotation about the axis relative to the wheel;
   a stator fixed in rotation about the axis relative to the torque tube;
   a clutch assembly selectively reciprocal between an engaged state and a disengaged state, engagement of the clutch assembly in the engaged state fixing the torque tube in rotation about the axis relative to the axle, the torque tube being rotatable about the axis relative to the axle when the clutch assembly is in the disengaged state;
   a plurality of linear actuators fixedly positioned in rotation relative to the axle when the clutch assembly is in the disengaged state, each linear actuator being configured to selectively be extended and retracted; and
   a transmission converting linear actuator motion from of the plurality of linear actuators into rotational movement of the stator when the clutch assembly is in the disengaged state.

2. The landing gear system of claim 1, wherein the clutch assembly comprises one of a curvic clutch and a dog clutch.

3. The landing gear system of claim 1, wherein the transmission transfers linear actuator motion from the plurality of linear actuators to engage the rotor with the stator.

4. The landing gear system of claim 3, wherein engagement of the rotor with the stator provides a driving force that rotates the wheel when the clutch assembly is in the disengaged state.

5. The landing gear system of claim 3, wherein engagement of the rotor with the stator provides a braking force when the clutch assembly is in the engaged state.

6. The landing gear system of claim 1, wherein the transmission comprises:
   a cam operably coupled to the stator and fixed in rotation about the axis relative to the stator; and
   a plurality of cam followers, each cam follower being coupled to one of the plurality of linear actuators.

7. The landing gear system of claim 6, wherein each of the plurality of actuators selectively extends and retracts when the clutch assembly is in the disengaged state to engage and disengage the cam followers from the cam, wherein engagement and disengagement of the cams followers from the cam rotates the cam about the axis.

8. The landing gear system of claim 7, wherein the cam comprises a cam surface having a sinusoidal profile.

9. The landing gear system of claim 7, wherein the cam comprises a planar cam surface angled relative to the axis.

10. The landing gear system of claim 7, wherein extending and retracting each of the plurality of actuators in a first sequence rotates the cam in a first direction.

11. The landing gear system of claim 10, wherein extending and retracting each of the plurality of actuators in a second sequence rotates the cam in a second direction.

12. A landing gear system, comprising:
a wheel rotatably coupled to an axle about an axis;
a rotor fixed in rotation about the axis relative to the wheel;
a stator rotatably mounted to the axle about the axis;
a clutch assembly selectively reciprocal between an engaged state and a disengaged state, engagement of the clutch assembly in the engaged state fixing the stator in rotation about the axis, the stator being rotatable about the axis when the clutch assembly is in the disengaged state;
a plurality of linear actuators fixedly positioned in rotation relative to the axle when the clutch assembly is in the disengaged state, each linear actuator being configured to selectively be extended and retracted; and
a transmission operably coupled to the plurality of linear actuators, wherein the transmission applies an axial force to engage the stator with the rotor when the clutch assembly is in the engaged state and when the clutch assembly is in the disengaged state.

13. The landing gear assembly of claim 12, wherein the transmission converts axial forces applied by the plurality of linear actuators into a moment that rotates the stator.

14. The landing gear system of claim 13, wherein the transmission comprises:
a cam coupled to the stator; and
a plurality of cam followers, each cam follower being coupled to one of the plurality of linear actuators.

15. The landing gear system of claim 14, wherein the cam comprises a cam surface having a sinusoidal profile.

16. The landing gear system of claim 14, wherein the cam comprises a planar cam surface angled relative to the axis.

17. The landing gear system of claim 14, wherein each of the plurality of actuators selectively extends and retracts when the clutch assembly is in the disengaged state to engage and disengage the cam followers from the cam, wherein engagement and disengagement of the cam followers from the cam rotates the cam about the axis.

18. The landing gear system of claim 17, wherein extending and retracting each of the plurality of actuators in a first sequence rotates the cam in a first direction.

19. The landing gear system of claim 18, wherein extending and retracting each of the plurality of actuators in a second sequence rotates the cam in a second direction.

* * * * *